(12) United States Patent
Wu

(10) Patent No.: US 11,490,197 B1
(45) Date of Patent: Nov. 1, 2022

(54) PERSONAL AUDIO ENTERTAINMENT SYSTEM

(71) Applicant: Wudi Industrial (Shanghai) Co., Ltd., Shanghai (CN)

(72) Inventor: Peng Wu, Shanghai (CN)

(73) Assignee: WUDI INDUSTRIAL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/347,803

(22) Filed: Jun. 15, 2021

(30) Foreign Application Priority Data

May 7, 2021 (CN) .......................... 202120953639.7

(51) Int. Cl.
    *H04R 3/00*      (2006.01)
    *A63F 13/25*      (2014.01)
    *H04R 1/02*      (2006.01)

(52) U.S. Cl.
    CPC .............. *H04R 3/00* (2013.01); *A63F 13/25* (2014.09); *H04R 1/025* (2013.01); *H04R 2420/07* (2013.01)

(58) Field of Classification Search
    CPC ....... H04R 1/025; H04R 2420/07; H04R 3/00
    USPC ..................................................... 381/77–80
    See application file for complete search history.

(56) References Cited

U.S. PATENT DOCUMENTS 5,503,456 A * 4/1996 Rossini .................. A47C 7/425
                                                                        224/586
9,795,224 B2 * 10/2017 George, II ............. A47C 7/624

11,224,293 B2 * 1/2022 Case ........................ A47C 1/02
2010/0329491 A1 * 12/2010 Johansen ............. H04R 25/558
                                                                        381/315

(Continued)

*Primary Examiner* — Disler Paul
(74) *Attorney, Agent, or Firm* — Bayramoglu Law Offices LLC

(57) ABSTRACT

The patent application discloses a personal audio entertainment system, which comprises five major parts: entertainment play equipment, Bluetooth transmitter, gaming chair with audio play devices, Bluetooth receiver with charging function, and audio play equipment with a subwoofer and a Bluetooth receiver integrated in the main speaker.
The top of the Bluetooth audio gaming chair is connected with a neck pillow, one end of the neck pillow is fixedly connected with a lace, and one end of the lace is connected with a plug buckle, one end of the gaming chair is provided with a backrest, the bottom end of the backrest is connected with a cushion, the bottom end of the cushion is rotatably connected with a bracket, the bottom end of the bracket is connected with rollers, and one end of the gaming chair is connected with audio play devices; The audio play devices comprise speakers, wire, and a Bluetooth receiver, and the Bluetooth receiver and the speakers are connected by wire; The audio play equipment is composed of a main speaker, a sub-speaker, a subwoofer, wire and a Bluetooth receiver, and the Bluetooth receiver is integrated in the main speaker.
The personal audio entertainment system connects the entertainment play equipment with Bluetooth audio gaming chair and Bluetooth audio using Bluetooth transmitter, and have 4-channel stereo surround sound including front left sound, front right sound, rear left sound, and rear right sound. The personal audio entertainment system is highly efficient and convenient. There is no need to put independent speakers in the back of the chair to take up moving space.

5 Claims, 4 Drawing Sheets

(56) References Cited

U.S. PATENT DOCUMENTS

| | | | |
|---|---|---|---|
| 2013/0089217 A1* | 4/2013 | Kelloniemi | H04R 27/00 |
| | | | 381/77 |
| 2013/0315416 A1* | 11/2013 | Nakayama | H04R 3/12 |
| | | | 381/77 |
| 2014/0241543 A1* | 8/2014 | Woolfork | H04R 1/1083 |
| | | | 381/77 |
| 2017/0264994 A1* | 9/2017 | Gordon | H04R 1/1091 |
| 2021/0127841 A1* | 5/2021 | Park | A47C 7/727 |

\* cited by examiner

PERSONAL AUDIO ENTERTAINMENT SYSTEM

CROSS REFERENCE TO RELATED APPLICATIONS

This patent application claims the benefit of Chinese Patent Application No. 202120953639.7, filed May 7, 2021, of which the above applications is incorporated by reference herein.

TECHNICAL FIELD

The invention disclosure relates to the technical field of audio entertainment, in particular, a personal audio entertainment system.

BACKGROUND

As the Internet application technology becomes more and more mature, individual users have higher and higher demands for watching movies and singing at home, that is, the use of personal audio entertainment systems is becoming more and more widespread. The personal audio entertainment system achieves high-quality effects through multiple speakers simultaneously outputting different channels of audio.

Existing personal audio entertainment is to drill in the wall, wiring, and construction to hang large audio equipment on the ceiling or wall. However, this method is costly, requires construction, and involves damage. The original decoration also has potential safety hazards. For this reason, we propose a personal audio entertainment system.

SUMMARY

To overcome the shortcomings of the prior art, the present patent application provides a personal audio entertainment system. The personal audio entertainment system connects the entertainment play equipment and two sets of audio play equipment through wireless radio waves at the same time and have 4-channel stereo surround sound. The invention is efficient and convenient to use, and does not require drilling, wiring, and construction on the wall. The cost is low, the original decoration will not be damaged, and the safety is high.

In order to solve the above technical problems, the present invention provides the following technical solutions: a personal audio entertainment system including five major parts: entertainment play equipment, Bluetooth transmitter, gaming chair, Bluetooth receiver with a battery and charging function, and audio play equipment with a subwoofer. The top of the gaming chair is connected with a neck pillow, and one end of the neck pillow is fixedly connected with a lace. One end of the lace is connected with a buckle. One end of the gaming chair is provided with a backrest, where the bottom end of the backrest is connected with a cushion. The bottom end of the cushion is rotatably connected with a bracket, where the bottom end of the bracket is connected with rollers. The audio play devices are connected to one end of the gaming chair. The audio play devices are composed of speakers, wire, and a Bluetooth receiver with charging function. Each speaker is fixedly connected to each shoulder rest provided by each side of the backrest. One end of the backrest is provided with a through hole. The speakers on each shoulder rests are connected by wire, and are connected to a Bluetooth receiver in the storage bag through the through hole. One end of the Bluetooth receiver is connected to a Bluetooth transmitter through wireless radio waves. One end of the Bluetooth transmitter is connected to an entertainment play equipment, and one end of the Bluetooth transmitter is connected with audio play equipment through wireless radio waves.

As a preferred technical solution of the present invention, the backrest has a rectangular parallelepiped structure, and the bottom end of the backrest is vertically and rotatably connected to the edge of the cushion.

As a preferred technical solution of the present invention, the shoulder rests are at the sides of the backrest, and at the same horizontal position as the shoulder of the human body.

As a preferred technical solution of the present invention, a control panel is integrated with the Bluetooth receiving module, and the Bluetooth receiving module has charge and discharge function. The control panel controls the Bluetooth receiving function of the Bluetooth receiving module.

As a preferred technical solution of the present invention, the top of the backrest is provided with sound-transmitting openings, and the number of the sound-transmitting openings is two, and the two sound-transmitting openings are in symmetrical positions.

As a preferred technical solution of the present invention, it is connected with two audio play equipment at the same time. 1, one set of the audio play equipment is a Bluetooth audio gaming chair, the audio includes left and right channel speakers, one end of the gaming chair is provided with a Bluetooth receiving module, and the audio play devices are wirelessly connected with the Bluetooth transmitter through the Bluetooth receiving module. 2, the other set of audio play equipment is Bluetooth audio equipment, and the Bluetooth transmitter is connected with the audio play equipment through wireless radio waves.

As a preferred technical solution of the present invention, one end of the Bluetooth transmitter is provided with a USB interface, and the entertainment play equipment is connected to the Bluetooth transmitter through the USB interface.

Compared with the prior art, the beneficial effects that the utility patent application can achieve are:

The personal audio entertainment system connects the entertainment play equipment and two sets of audio play equipment through wireless radio waves at the same time and have 4-channel stereo surround sound, which is efficient and convenient to use, and does not require drilling, wiring, and construction on the wall. The cost is low, and the original decoration is not damaged and highly secured.

Among them: 121, audio play devices; 1221, speaker; 1222, wire; 1223, Bluetooth receiver; 122, backrest; 1228, shoulder rests; 123, cushion; 124, bracket; 1224, neck pillow; 1225, lace; 1226, buckle; 1229, through hole; 1230, storage bag; 1241, scroll wheel; 1227, sound-transmitting opening; 100, entertainment play equipment; 110, Bluetooth transmitter; 130, audio play equipment; 1301, front audio play equipment wire; 1302, front left sub-speaker; 1303, front right main speaker; 1304, subwoofer.

DETAILED EMBODIMENTS

To simplify the technical means, creative features, objectives, and effects of the patent application, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

Example

Figure 1:
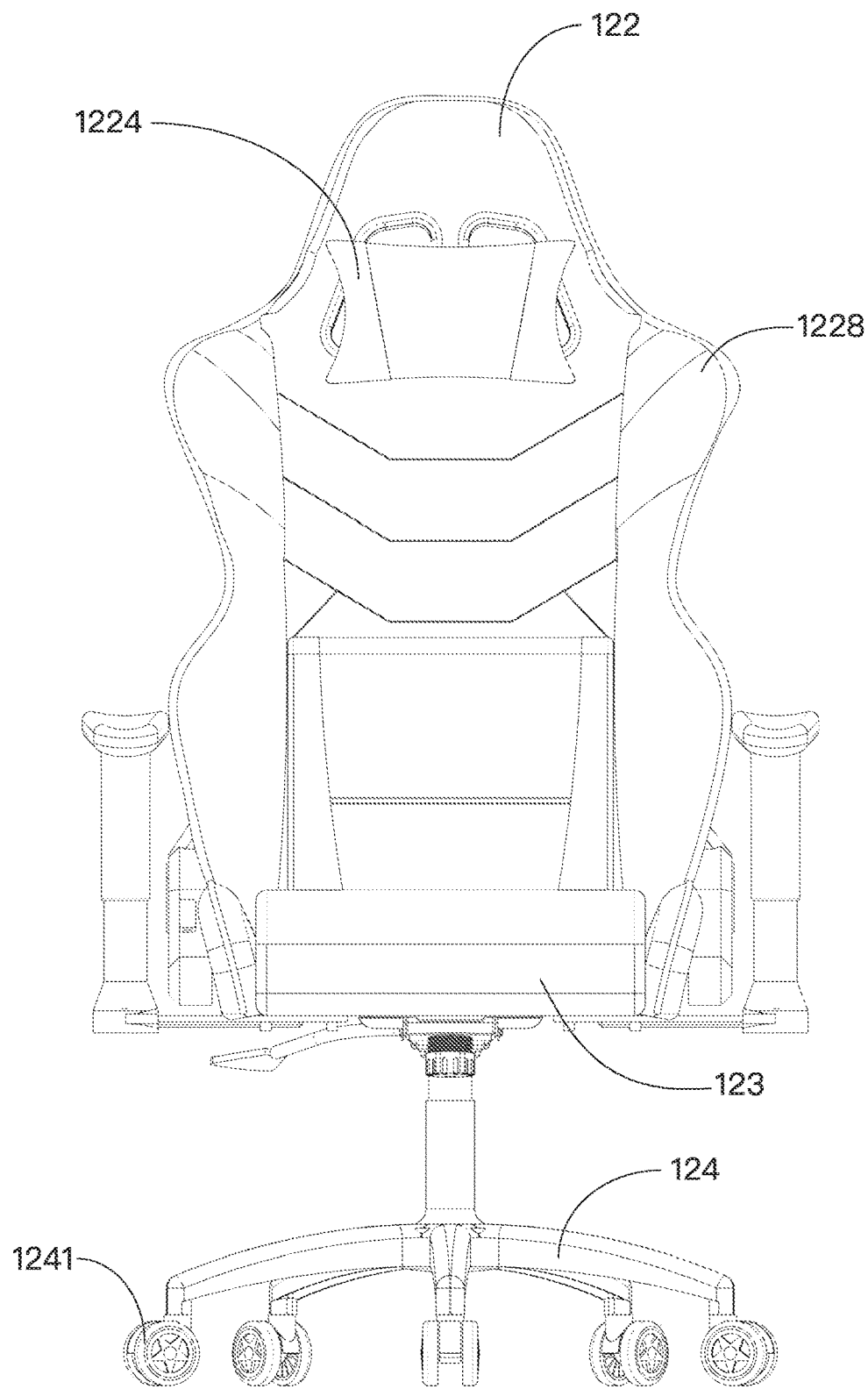
FIG. 1 is a schematic diagram of the front view structure of the utility patent application.
Figure 2:
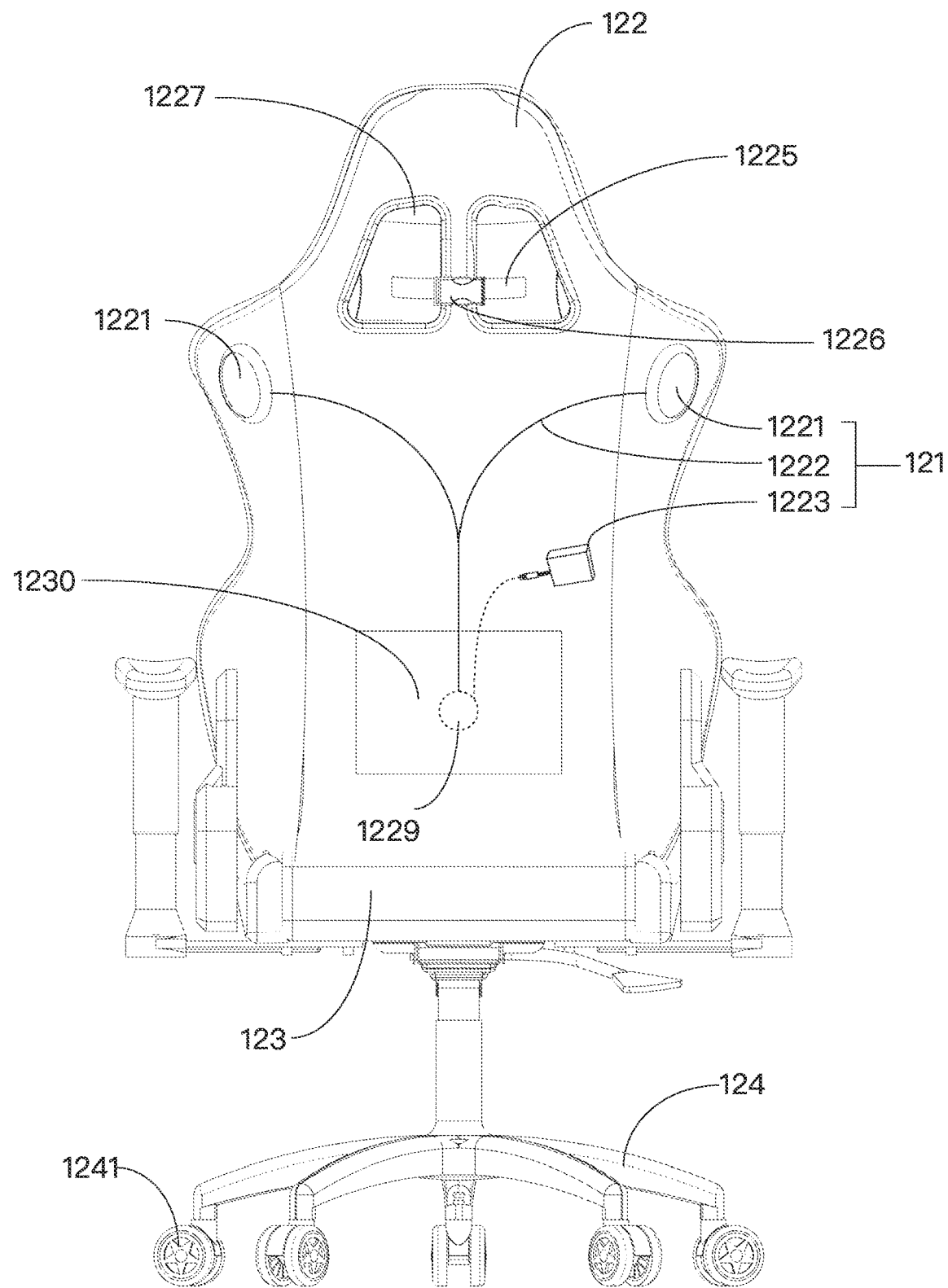
FIG. 2 is a schematic diagram of the back structure of the utility patent application.
Figure 3:
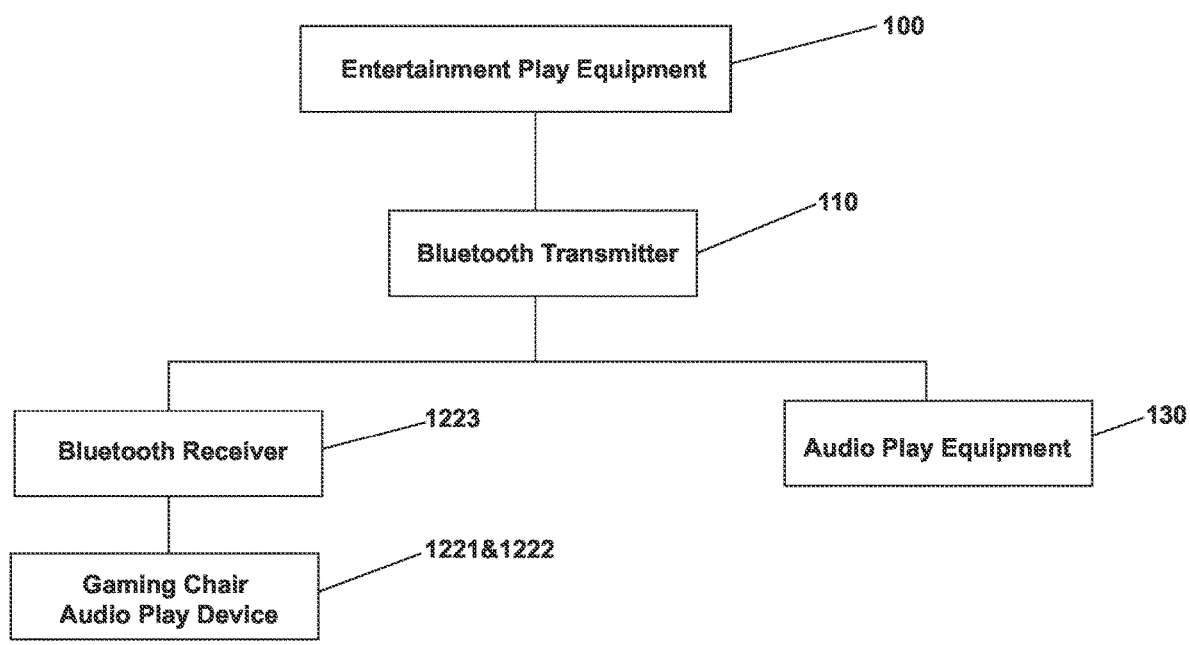
FIG. 3 is a schematic diagram of the system structure of the utility patent application.
Figure 4:
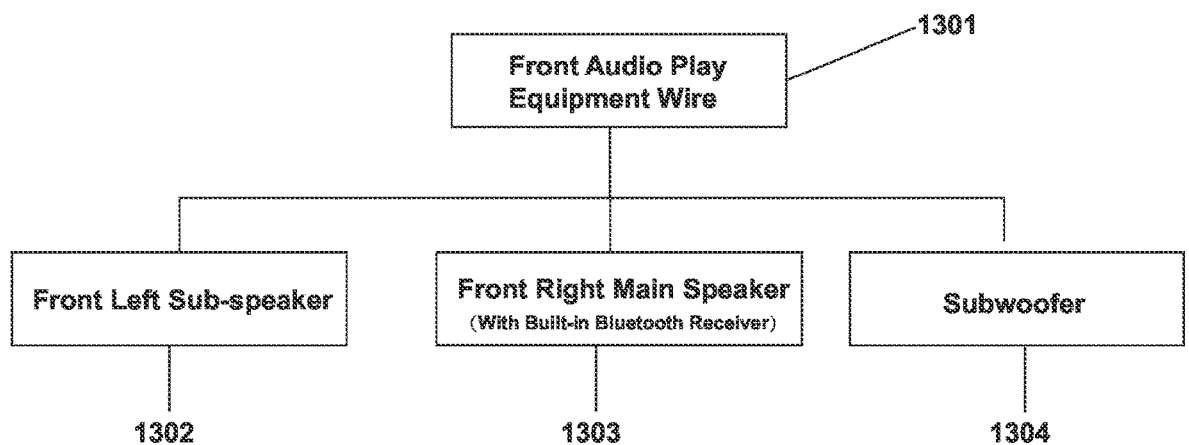
FIG. 4 is a schematic diagram of the system structure of the utility patent application.

As shown in FIGS. 1-3, the personal audio entertainment system includes five major parts: entertainment play equipment, Bluetooth transmitter, gaming chair, Bluetooth receiver with a battery and charging function, and audio equipment with a subwoofer. The top of the gaming chair is connected to a neck pillow 1224. One end of the neck pillow 1224 is fixedly connected with a lace 1225, and one end of the lace 1225 is connected to a buckle 1226. One end of the gaming chair is provided with a backrest 122. The bottom end of the backrest 122 is connected with a cushion 123. The bottom end of the cushion 123 is rotatably connected with a bracket 124. The bottom end of the bracket 124 is connected with rollers 1241, with one end of the gaming chair is connected with audio play devices 121. The audio play devices 121 are composed of speakers 1221, wire 1222, and a Bluetooth receiver 1223. The Bluetooth receiver 1223 and the speakers 1221 are connected by wire 1222, and one end of the speaker 1221 is fixedly connected to the back of the backrest 122. Both sides of the backrest 122 are provided with a shoulder rest 1228. And the other end of the speaker 1221 is connected to the shoulder rest 1228. The speakers 1221 is connected with the Bluetooth receiver 1223 in the storage bag 1230 through the through hole 1229 by the wire 1222, and the gaming chair backrest 122 is connected to a Bluetooth receiving module 1223 at one end. One end of the Bluetooth receiving module 1223 is connected with a Bluetooth transmitter 110 through wireless radio waves, and one end of the Bluetooth transmitter 110 is connected with the entertainment play equipment 100. One end of the Bluetooth transmitter 110 is connected with audio play equipment 130 through wireless radio waves.

The backrest 122, seat cushion 123, and shoulder rest 1228 are provided on the gaming chair to make it more comfortable when sitting back. With the storage bag 1230 provided, the Bluetooth receiver module 1223 can be inserted into the storage bag 1230 through the through hole 1229. The mobile phone can also be stored in the storage bag 1230 to free up user's hands, relax and rest. The rollers 1241 are set to facilitate the movement of the chair on the ground, and the entertainment play equipment can be connected with the Bluetooth transmitter and the audio play devices 121 on the gaming chair. The audio play devices 121 are connected, and the rear audio can be output through the gaming chair; this personal audio entertainment system connects the audio play devices 121 and the gaming chair through wireless radio waves. The personal audio entertainment system connects the entertainment play equipment and two sets of audio play equipment through wireless radio waves at the same time, and have 4-channel stereo surround sound. It is efficient and convenient to use, and does not require drilling, wiring, and construction on the wall. The cost is low, and the original decoration is not damaged and the safety is high. The rear audio play devices can be wirelessly recharged through Bluetooth receiving module 1223, which is convenient and practical.

In other embodiments, this embodiment discloses that, as shown in FIGS. 1-2, the backrest 122 has a rectangular parallelepiped structure, and the bottom end of the backrest 122 is vertically and rotatatively connected to the edge of the cushion 123; by setting the bottom end of the backrest 122 to the edge of the seat cushion 123 is vertically rotated and connected, which is more convenient to adjust the angle of the backrest 122 relative to the seat cushion 123, and it is convenient to adjust the angle between the legs and the spine when a person is resting.

In other embodiments, this embodiment discloses that, as shown in FIGS. 1-2, the shoulder rest 1228 is at the top of the backrest 122, and the two shoulder rests 1228 are at the same horizontal position as the shoulder of the human body; through the provided shoulder rest 1228, the shoulders of the person can be supported to improve the comfort of sitting, and the shoulder rest 1228 is blocked between the ears of the person and the speaker, which is beneficial to reduce the damage to the ear caused by the audio emitted by the speaker.

In other embodiments, this embodiment discloses, as shown in FIGS. 1-2, a control panel is integrated with the Bluetooth receiving module, and the control panel controls the Bluetooth receiving function of the Bluetooth receiving module by setting the control panel, it can be used during rest. The control panel on the Bluetooth receiver module, controls the speakers such as play, pause, stop, previous song, next song, volume adjustment and other control functions.

In other embodiments, this embodiment discloses that, as shown in F the top of the backrest 122 is provided with sound-transmitting openings 1227, and the number of sound-transmitting openings 1227 is two, and the two sound-transmitting openings 1227 are in a symmetrical position. Through the opening of the sound openings, when a person sits on a chair, the sound openings are located at the shoulder rest of the person. The audio from the speaker on the back of the backrest 122 can be transmitted to the human ear through the sound openings, and the sound is transmitted from the sound openings and the distance between the outer side of the shoulder rest 1228 and the human ear is different, which has the effect of creating a spatial stereo sound effect.

In other embodiments, this embodiment discloses, as shown in FIGS. 1-3, the gaming chair is a Bluetooth audio gaming chair including left and right channel speakers. The gaming chair is equipped with a Bluetooth receiver module 1223 at one end. The audio play devices 121 are wirelessly connected to the Bluetooth Transmitter 110 through the Bluetooth receiving module. The audio play equipment 130 is Bluetooth audio equipment composed of left and right channel speakers and subwoofer. The audio play devices 130 and the Bluetooth transmitter 110 are wirelessly connected, which is more convenient to use and helps to reduce the use of space.

In other embodiments, this embodiment discloses that, as shown in FIGS. 1-2, one end of the Bluetooth transmitter 110 is provided with a USB interface, and the entertainment play equipment 100 is connected to the Bluetooth transmitter 110 through the USB socket, and the entertainment play equipment can have multi-object Bluetooth transmission function.

In the present invention, unless otherwise clearly ruled or limited, the "upper" or "lower" of the first feature of the second feature may include direct contact between the first and second features, or include it when the features are not in direct contact but through other features between them. Moreover, "above" the second feature of the first feature include the first feature being directly above and obliquely above the second feature, or it simply means that the level of the first feature is higher than that of the second feature. The "below" the first feature of the second feature include the first feature directly below and obliquely below the second feature, or it simply means that the level of the first feature is lower than the second feature.

The above shows and describes the basic principles, main features and advantages of the patent application. Those skilled in the industry should understand that the present patent application is not limited by the above-mentioned embodiments. The above-mentioned embodiments and the description are only preferred examples of the present patent application and are not intended to limit the present patent application, without departing from the present patent application. Under the premise of spirit and scope, the present patent application will have various changes and improvements, and these changes and improvements fall within the scope of the claimed patent application. The scope of protection claimed by the patent application is defined by the appended claims and their equivalents.

The invention claimed is:

1. A personal audio entertainment system, comprising: entertainment play equipment;
a Bluetooth transmitter with a USB interface comprising a USB socket;
a gaming chair;
a Bluetooth receiver with charging function; and
audio play equipment comprising speakers, wire, a subwoofer, and the Bluetooth receiver and speakers are connected by wire;
wherein a top of the gaming chair is connected to a neck pillow and one end of the neck pillow is fixedly connected with a lace, and one end of the lace is connected to a buckle;
wherein one end of the gaming chair is provided with a backrest and the bottom end of the backrest is connected with a cushion;
wherein a bottom end of the cushion is rotatably connected with a bracket and a bottom end of the bracket is connected with rollers, with one end of the gaming chair is connected with audio play equipment;
wherein both sides of the backrest are provided with a shoulder rest, and one of the speakers is connected to the back of each shoulder rest;
wherein the backrest is provided with a through hole at one end, the Bluetooth receiver is connected with the through hole, and the through hole is connected to the Bluetooth receiver, and the backrest is fixedly connected with the Bluetooth receiver in a storage bag, at one end, and the gaming, chair backrest is connected to Bluetooth receiver at one end, and a top of the backrest is provided with sound-transmitting openings, and the number of sound-transmitting openings is two, and the sound-transmitting openings are positioned symmetrically, and wherein the neck pillow connected to the top of the gaming chair is connected by the lace extending through each sound-transmitting opening and buckling with the buckle around a portion of the backrest between the sound-transmitting openings;
wherein one end of the Bluetooth receiver is connected with a Bluetooth transmitter through wireless radio waves, and one end of the Bluetooth transmitter is connected with the entertainment play equipment;
wherein one end of the Bluetooth transmitter is connected with audio play equipment through wireless radio waves via the Bluetooth receiver module;
wherein the entertainment play equipment is connected to the Bluetooth transmitter through the USB socket.

2. The personal audio entertainment system according to claim 1, wherein the backrest has a rectangular parallelepiped structure, and the bottom end of the backrest is vertically rotatably connected with the edge of the cushion.

3. The personal audio entertainment system according to claim 1, wherein the shoulder rests are at the sides of the backrest, and the shoulder rests are in the same horizontal position as the shoulder of the human body.

4. The personal audio entertainment system according to claim 1, wherein a control panel is integrated with the Bluetooth receiving module, and the Bluetooth receiving module has charge and discharge function, the control panel controls the Bluetooth receiving function of the Bluetooth receiving module.

5. The personal audio entertainment system according to claim 1, wherein the audio play equipment speakers include left and right channel speakers, the personal audio entertainment system comprising a further set of audio play equipment, and the Bluetooth transmitter is connected with the further set of audio play equipment through wireless radio waves.

* * * * *